April 16, 1968 R. M. SHIRK 3,378,349
APPARATUS FOR TREATING MIXED-PHASE FLUID REACTANTS
Filed Sept. 17, 1965 2 Sheets-Sheet 1

INVENTOR.
Robert M. Shirk
BY
William Klabunde
ATTORNEY.

April 16, 1968    R. M. SHIRK    3,378,349
APPARATUS FOR TREATING MIXED-PHASE FLUID REACTANTS
Filed Sept. 17, 1965    2 Sheets-Sheet 2

INVENTOR.
Robert M. Shirk
BY
William Klabunde
ATTORNEY.

3,378,349
APPARATUS FOR TREATING MIXED-PHASE
FLUID REACTANTS
Robert M. Shirk, Wilmington, Del., assignor to Air Products and Chemicals, Inc., Philadelphia, Pa., a corporation of Delaware
Filed Sept. 17, 1965, Ser. No. 488,218
6 Claims. (Cl. 23—288)

This invention relates, in general, to method and apparatus for treating mixed-phase fluid reactants while passing the same continuously, and serially downward through a plurality of separate treating zones each comprising a fixed bed of contact material, as applied, for example, to a chemical treating system employing an elongated upright reactor vessel internally subdivided into separate, communicating reaction chambers each containing its respective bed at an intermediate level therein, with provision therein for uniform distribution or redistribution of mixed-phase fluid at the surface of the bed and for disengagement and collection of the same at the bottom of the bed.

More particularly, the invention is directed to such above-mentioned apparatus in which it is desired or required to introduce, for whatever purpose, additional gaseous, liquid or mixed-phase fluid into the downwardly-flowing, mixed-phase fluid stream as it passes serially between adjacent beds of contact material, and in which it is essential to achieve full contact and thorough admixing of all fluid components prior to their introduction to a next lower bed, as well as optimum uniformity in the distribution of such fluid components over the surface of and into the receiving bed. Primary purposes for which such additional fluid material may be added would include the achievement of a positive control on the composition and temperature of the mixed-phase fluid stream entering each bed.

In its broader aspects, the invention contemplates that the beds of contact material may be the same or different as to form and composition for each of the treating zones, dependent upon the charge requirements for the respective zone or the treatment to be effected therein, and that the additional fluid to be introduced may be of the same composition or of different composition for each treating zone. Also, where temperature adjustment is required between successive stages of treatment, the additional fluid streams may be given preliminary individual temperature adjustment to satisfy the respective temperature requirements for the fluid streams entering the beds.

A particularly useful field of application for the invention, however, is that of petroleum refining. For example, the apparatus is especially useful in the treatment, such as hydrocracking, of hydrocarbon feed stocks ranging from naphthas and straight-run catalytic or thermal gas oils to heavy vacuum or deasphalted gas oils, in which treatment a typical charge stock may comprise fresh mixed-phase hydrocarbon feed, recycle hydrocarbons (gaseous, liquid, or mixed phase) and hydrogen, principally as recycle. The additional fluid introduced between reaction zones may comprise gaseous or liquid hydrocarbon material introduced primarily for temperature control and possibly for composition adjustment, the added material being either at higher temperature to add heat to the bed or at lower temperature to serve as quench.

Regardless of its specific application, the invention contemplates as a primary objective the thorough contacting and admixing of the disengaged and collected gaseous and liquid components of the mixed-phase stream with the introduced additional fluid material, to the end that optimum composition and temperature control at each reaction stage of the process may be assured.

Such objective is most readily attained not only through the efficient contacting and admixing of the fluid materials but also through external arrangements of known design, individual to each supply stream of additional fluid, whereby the composition and temperature of such supply streams may be predetermined and adjusted in accordance with the specific requirements of the bed for which an individual supply stream is intended.

In accordance with the invention, compact masses of contact material, porous to the particular mixed-phase material to be treated, are supported as fixed beds, one spaced above another and each in a separate treating zone, along a confined continuous downflow path, as provided, for example, by an elongated upright reactor vessel of cylindrical shape, internally partitioned to provide a plurality of reaction chambers. The porous contact mass may be of any material and of any shape or arrangement suitable to the intended purpose. It may, for example, comprise particulate material in the form of spheres, extruded pellets, or graded granular material of discrete particle size having known desirable physical or chemical characteristics, such as being highly heat retentive or catalytic. If the contact material is particulate, the beds may be supported in known manner upon horizontal grids or gratings. Furthermore, beds of granular or other particulate material may each comprise superimposed layers of material differing in composition, size, form and function.

The reactor vessel in which the treatment is carried out may be longitudinally subdivided or partitioned into separate chambers, each chamber being partially filled with a bed of contact material comprising a main treating zone. The bed is supported near the bottom of the chamber and is provided with a fluid-distributing region above the surface of the bed and a fluid-collecting plenum beneath the bed. Mixed-phase fluid passing downwardly through the bed is disengaged from the contact material at the bottom of the bed and passes into the fluid-collecting plenum below.

The mixed-phase charge stream is introduced at the upper end of the reactor and is distributed over the surface of the uppermost bed. After passing serially through the entire series of beds comprising the treating zones, the fluid material disengaged from the lowermost bed is discharged at the lower end of the reactor.

In passing between two adjacent beds, the disengaged mixed-phase fluid collected in the fluid-collecting plenum of the upper bed is caused to flow out of the plenum through a restricted axial opening and downflow conduit at the bottom thereof. Such fluid is discharged as a confined stream within a deep central region of an otherwise shallow pool of previously discharged liquid material supported on a tray or splash basin near the top of the next lower chamber, above the surface of the bed contained therein. The deep central region of the liquid pool is laterally confined, and the mixed-phase fluid discharging therein from the plenum above is introduced downwardly within the confined deep portion of the pool, so that the fluid stream is caused to reverse its direction of flow outwardly and upwardly around the lower periphery of the confined stream entering the pool. Gaseous components continually rise from the deep region of the pool into the space between the surface of the pool and the partition separating the reaction zones.

The thorough admixing of all fluid material within the pool assures that the temperature will come to an equilibrium, thereby enabling the top temperature of the next lower zone to be controlled.

As the collected disengaged fluid material passes downwardly and inwardly toward the central outlet of the plenum it is contacted by additional fluid material introduced into the plenum, as by discharge from a manifold pipe or ring supported over the central region of the plenum.

The additional fluid may be gaseous, liquid or mixed-phase. If it is liquid-containing, the liquid portion may be introduced in known manner as an atomized spray of liquid particules. Such additional fluid is supplied from one or more sources exteriorly of the vessel, and is conveyed as an individual confined stream into each plenum. Conventional means is provided outside the vessel for controlling and adjusting the temperature and flow rate of each additional stream. Thus, the additional fluid material may be supplied from either a common source or separate sources, and its composition, rate of flow and temperature may be the same for each treating zone or be varied in any respect in accordance with the requirements in a particular zone.

In introducing the additional fluid material into a plenum, the manner of introduction will depend upon the nature and physical state of the material being introduced. Since the added fluid may be gaseous, liquid or mixed phase, the discharge nozzles should be of a design suitable to effect the maximum dispersion of the added material and admixture thereof with the disengaged mixed phase material. If the added fluid material is gaseous, the nozzle may be of a type which will rapidly distribute the gaseous material throughout the plenum. If the material is liquid the nozzle may be a spray or atomizing type arranged to direct the discharging stream laterally across the central region of the plenum to intercept free-falling disengaged liquid components and to intimately admix with disengaged gaseous components as they flow toward the central outlet at the bottom of the plenum. Complete contact and admixture of all gaseous and liquid material is ultimately assured, however, since the gaseous components must bubble upwardly through the deep portion of the pool of collected liquid supported beneath the plenum.

In a preferred form of apparatus in accordance with the invention, the reactor comprises an upright, elongated cylindrical vessel which, as applied to large-scale commercial operation in the chemical processing industry, may be in the order of ten or more feet in diameter and fifty or more feet in height. The vessel may be closed at its upper and lower ends with the usual hemispherical heads provided with central flanged connectors by means of which the reactor may be connected to a supply conduit for fluid charge at the top and a discharge conduit for removal of product fluid at the bottom. Conventional provision is made for introducing or removing contact mass material. The usual manhole is provided, whereby access may be had by workmen to the interior of the vessel, and whereby segmental and other movable portions of the intervals or fittings may be passed into or removed from the vessel.

The vessel is internally separated into a plurality of, such as two or more, reaction chambers by horizontal partitions, preferably in the form of dished members having their edges turned upward and joined to the inner wall of the vessel. Along the axis of the vessel, each partition is provided with a central restricted outlet having a relatively-short, vertical draw-off conduit through which the mixed-phase fluid is conveyed from chamber to chamber. The central outlets are sized to provide a substantial increase in the flow rate of the fluid as it leaves the reaction chamber, up to a maximum consistent with practicable operation.

Each partition, and also the bottom head or closure member of the vessel, is provided with a group of support members which may extend upwardly from the surface of the partition or inwardly from the side walls, or both. The support members may support the contact mass directly, as where the mass is rigid, or they may support a horizontal grid or grating which extends across the vessel and which, in turn, supports a bed of particulate material, such as granular catalyst. The grid may be segmental for easy installation and removal through the central outlets in the partitions and through the customary manhole provided at the top of the vessel.

A typical grid-supported fixed bed may comprise, for example, a first layer of particulate material, such as alumina balls, of a size larger than the openings in the grid, a second layer of somewhat smaller-size particles of the same material, a layer of still smaller particles of inert material, followed by the main body of the bed, composed of granular material, such as catalyst in any of its common granular forms, for effecting or promoting the desired treatment of the fluid reactants.

The bed-supporting members, such as grids, support the bed above the partition, or other member forming the bottom of a reaction chamber, at a distance sufficient only to provide a fluid-collecting plenum for the liquid and gaseous components of the mixed-phase fluid disengaged from the contact material at the bottom of the bed. In the case of a grid-supported bed of granular solids the disengaged fluid material enters the plenum through the openings of the grid.

Individual conduits are provided for the introduction of additional fluid material from an external source into the plenums. The individual supply conduits may enter the vessel through a single opening in the vessel, and be distributed inside the vessel to the various plenums, or through different openings provided at convenient locations along the vessel wall, in which case the supply conduits lead individually to their respective plenums. Individual means is provided for each supply conduit to control and regulate the temperature and flow rate of the fluid, so that each plenum may receive its supply of additional fluid at a rate and at a temperature suitable to the requirements of the particular plenum. The additional fluid supplied to all the plenums may originate from a common source of supply or, alternatively, different fluids or mixtures of fluids may be supplied to the various plenums from various sources. A fluid supply conduit may enter a plenum from the top after first passing through all or a portion of the associated bed, or such conduit may enter a plenum by passing through an opening provided in a wall of the plenum. The additional fluid is introduced into the plenum at one or more locations, for example, by a single nozzle if the added material is a gas or by a nozzle ring or other distributing device adapted and arranged to achieve the optimum admixture of the added fluid with the mixed-phase fluid collected in the plenum when the added material is vaporous or mixed phase. For example, the fluid may be discharged through jets or spray nozzles which direct the fluid laterally across the central region of the plenum, that is, above the outlet.

The tray or splash basin for supporting a pool of collected disengaged liquid beneath a plenum may extend wholly across the vessel and be in liquid-tight connection therewith along its edge, or it may be smaller and have an upright portion along or adjacent to the outer edge, which laterally confines the broad pool of collected liquid. A recessed central area of the tray forms a well to contain a much deeper portion of the body of liquid. In any case, the tray extends horizontally across at least the major portion of the vessel. If the tray is smaller than the diameter of the vessel it may be supported at its edge by brackets attached to the side wall of the vessel or be suspended by rods depending from the underside of the partition above.

The outer shallow portion of the tray is perforated to form a tube-sheet for receiving the upper end portions of downflow pipes which drain liquid from the shallow portion of the tray and conduct other fluid from the space above the pool to the space above the bed below. The upper ends of the downflow pipes are at a common level above the bottom of the tray so as to determine the depth of the pool and to provide concurrent liquid overflow through all pipes.

The central well portion of the tray is sufficiently oversize in relation to the diameter of the plenum outlet conduit projecting downwardly therein and the plenum outlet conduit itself is of such size, that the gaseous material accompanying the liquid into the well and then bubbling up to be disengaged at the surface of the pool will be thoroughly admixed with the liquid but will not seriously disrupt the body of liquid by excessive turbulence. The gaseous material disengaged at the surface of the pool may flow in part through an annular space provided between the edge of the tray and the vessel wall and in remaining part through the downflow pipes along with the overflowing liquid, or all the gaseous material may flow with the liquid through the downflow pipes, dependent upon the construction of the tray.

The downflow pipes conduct the overflowing liquid and the accompanying gaseous material to discharge locations which are at a level just above the surface of the below-adjacent bed and which are horizontally spaced in a pattern which will effect the optimum fluid distribution over the surface of the bed. To this end, the downflow conduits may be single pipe elements, some straight and the others offset, or, alternatively, the offset conduits may comprise two offset straight pipe sections connected by a horizontal crossover which may be an open trough or a pipe. A baffle is provided at the discharge end of each downflow pipe or conduit to deflect and distribute the fluid laterally, and to dissipate any force of discharge which might disturb the surface of the bed.

Where the downflow pipes are such as to laterally confine the fluid stream along its entire path of flow from the tray to a discharge location above the surface of the bed, the volume of gas or vapor flow through the downflow pipe, the size of the gap between the discharge end of the downflow pipe and its baffle and the baffle placement may be so related as to produce a nozzle effect whereby the accompanying liquid is forcefully sprayed horizontally from the baffle to cover a relatively broad surface area of the bed, greater than that which would be covered if the liquid material merely ran off the edge of the baffle.

For a fuller understanding of the invention, reference may be had to the following description and claims taken in connection with the accompanying drawings forming a part of this application, in which FIGURE 1 is a sectional elevation of an upright multi-bed reactor embodying the invention, non-essential details of construction being omitted and portions of the drawings being somewhat diagrammatic for ease of description and understanding;

Figure 1:
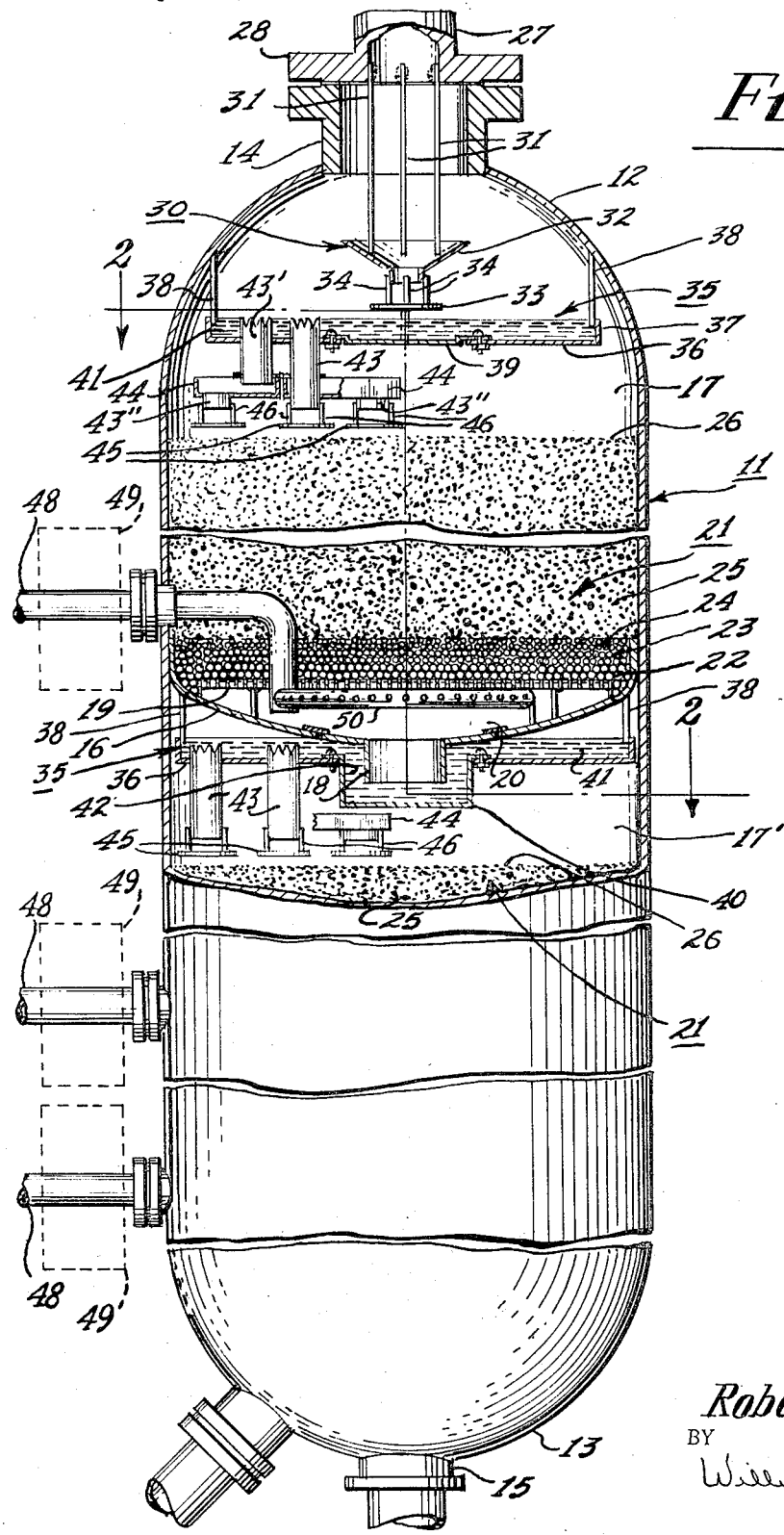
Figure 2:
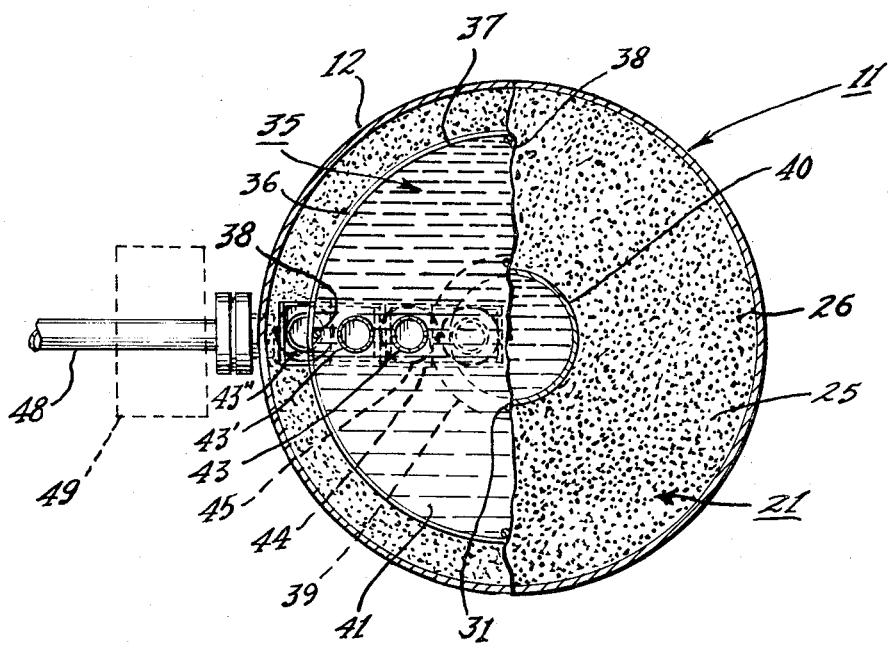
FIGURE 2 is a horizontal section taken along the line 2—2 of FIGURE 1.

In the drawings, the upright reactor comprises a cylindrical vessel or shell 11, closed at its upper and lower ends by curved heads 12 and 13 provided with flanged connectors 14 and 15, respectively, for top connection to a mixed-phase fluid charge line and bottom connection to a treated product draw-off line.

Vessel 11 is internally subdivided by dished partitions 16 into a plurality of separate treating or reaction chambers 17, 17′, etc., only the uppermost chamber 17 and a portion of the next lower chamber 17′ being shown in section. Each dished partition 16 has a central opening therein from which depends a discharge or outlet conduit 18.

Any desired number of reaction chambers may be provided, consistent with the efficient maintenance of continuous serial flow of mixed-phase fluid downwardly through the vessel and of treating or reaction temperature control.

For the purpose of illustrating one embodiment of the invention, the apparatus will be described in connection with a process involving the use of fixed beds of granular contact material, such as a fixed-bed petroleum refining process employing granular catalyst, but it is to be understood that the invention is not so limited, and that rigid bodies or masses of contact material instead of small granular particles may be employed.

Since the fixed beds of contact material are composed of granular particles, each reaction chamber is provided with a metal grating or grid 19 disposed horizontally within the dished partition 16. Between partition 16 and grid 19 a space or plenum 20 is provided for the collection of mixed-phase fluid which, having passed through and become disengaged from the bed of granular material supported by the grid, is to be conveyed to the treating chamber and fixed bed next below.

Grid 19 is preferably of segmental form, so that it may readily be passed into the vessel and through the various partitions by manhole provisions of conventional design and may be assembled or disassembled in place, but for ease of description, and since it forms no part of the invention, it is diagrammatically illustrated as a single member extending across the vessel.

The fixed bed of granular contact material supported by the grid 19 is generally indicated by the numeral 21 and is of conventional type, such as might be employed in any of several known hydrocarbon treating processes. Bed 21 comprises a first or bottom layer 22 of alumina balls somewhat larger than the openings in the grid or grating, a second layer 23 of smaller alumina balls, such as about half-size, and a third layer 24 of granular inert material of still smaller size. These three layers are each only several inches in depth. A deep body of contact material 25 composed, for example, of granular catalyst in the form of spheres, pellets, etc., rests upon the layer 24 of inserts and constitutes the main portion of the bed. The top or surface of the bed is indicated by numeral 26.

Inlet connector 14 at the upper end of the vessel 11 is large enough to provide a manhole for access to the interior of the vessel. The conduit 27 which conveys mixed-phase fluid charge to the reactor vessel 11 may be of substantially smaller diameter than connector 14 so that the face of its connecting flange 28 partly closes the manhole opening.

A baffle 30 is suspended axially below the inlet connector 14 by vertical rods 31 having their upper ends joined to the inner walls of flanged conduit 27 and their lower ends joined to a shallow funnel member 32 forming a fluid-collecting portion of the baffle. Funnel member 32 is wide enough at its upper end to intercept or collect a substantial portion of the liquid components of the charge stream entering the vessel. Gaseous components of the charge stream are in large part deflected by the baffle toward the upper peripheral region of reaction zone 17. A flat baffle plate 33 is suspended horizontally below the short neck of funnel 32 by vertical rods 34. Liquid and any accompanying gaseous material passing through the funnel 32 is deflected laterally by the baffle.

Fluid-distributing means, generally indicated at 35, is provided above the surface 26 of each bed 21 within the reactor vessel. Except for slight modification of the distributing means located above the uppermost bed, they may all be of identical construction.

Fluid-distributing means 35 comprises a splash basin or tray 36 disposed horizontally and concentrically within the free space above the surface 26 of bed 21. Tray 36 comprises a flat plate-ring having a manhole-size central opening and a plurality of uniformly distributed smaller openings which, for example, may be equi-spaced along circles concentric to the axis of the tray. The tray has an upturned outer rim 37 high enough to contain a shallow body of liquid on the tray. The tray is suspended from above by vertical rods 38 attached at their lower ends to rim 37 of the tray and at their upper ends to the underside of the curved plate member forming the roof of the chamber, that is, to the curved head 12 of the uppermost chamber and to the partition 16 of each of the other chambers.

The central opening of the uppermost tray 36 is closed by a cover plate 39 which is substantially liquid-tight and also removable. The central opening of the tray serves as a manhole when access to the interior of a chamber is required, such as when removable internals of the vessel are being installed or dismantled for removal or repair and when the beds of contact material are being made up or replaced.

Each central opening of the lower trays 36 is provided with a relatively-deep, cylindrical, flanged receptacle 40 which is removably set in the central opening of the tray and is supported by the flange in substantially liquid-tight engagement.

Each tray 36 supports a body or pool of collected liquid 41. On the uppermost tray 36, the pool of liquid is uniformly shallow throughout the horizontal area of the tray. On the lower trays, the receptacle 40 provides a relatively-deep well, so that the central area of the pool is considerably deeper than the peripheral area. Liquid discharge conduits 18 project centrally downward into the wells formed by receptacles 40 and terminate at a low level therein so that all fluid entering a well from a discharge conduit 18 must reverse its direction of flow to reach the upper level of the tray. In so doing, the fluid must pass upwardly through the annular passageway 42 formed between the side walls of the receptacle 40 and the conduit 18. The size and space relationships are such that for a desired fluid throughput the optimum mixing action is obtained, without excessive agitation and disruption of the liquid pool.

The plate-ring of tray 36 forms a tube-sheet containing the upper end portions of downflow pipes 43 and 43' which project a uniform distance above the base of the tray and terminate at a common level below the upper edge of the rim 37. The pipes provide both overflow paths for excess liquid accummulating in the pool 41, thereby serving to maintain the pool at a constant level, and paths for accompanying gaseous material flowing from the region above the pool to the region below the tray. The gaseous material flows in part through tubes 43, 43' and in part through the annular space between the rim 37 of the tray and the wall of vessel 11. As an alternative arrangement, the tray may extend entirely across the vessel, so that all or most of gaseous material is caused to flow with the liquid through downflow tubes 43 and 43'.

Some of the downflow pipes, those indicated by the numeral 43, are single straight pipe sections, while the others 43' have a separate lower section 43". The vertical pipe sections 43' and 43" are offset and are interconnected by a horizontal, open channel or trough member 44. Thus, liquid drained from tray 36 through pipe 43' is deposited in channel 44 and is then drained from the channel through pipe 43".

Each of single drain pipes 43 and of lower drain pipe sections 43" are provided with horizontal baffle plates 45 supported a short distance below the discharge end of the pipe and attached thereto by vertical rods 46.

Channels 44 are of such individual length and are directionally so disposed in a horizontal plane as to place the associated pipe sections 43" directly over discharge locations at the surface 26 of the bed 21 which cannot be reached by the single straight pipes 43. The discharge locations for pipes 43 and 43" are arranged in a pattern which will effect a uniform distribution of the fluid over the surface of the bed.

The drain pipe arrangement may be the same for all trays except the uppermost tray. Because of its proximity to the curved head 12 of the vessel 11, the uppermost tray may be smaller than the other trays, as shown. This limitation may require that, for the uppermost tray 36, at least some of the drain pipes be of the offset type, so as to reach the outermost portions of the bed surface. For the lower trays, straight pipes 43 will be able to service the outer reaches of the bed surface.

Openings are provided along the side of vessel 11 to admit conduits 48 for supplying additional fluid. Conduits 48 are connected to a source of additional fluid, not shown, which may be the same for each bed level, or may be different. Each supply conduit 48 has associated therewith individual means for controlling or adjusting the rate of flow and the temperature of the fluid passing through the conduit. Such means, being well known and of conventional design, is therefore only diagrammatically illustrated by broken lines and is designated generally by the numeral 49. The additional fluid may be liquid or gaseous or mixed phase, dependent upon the process involved and the function of the additional liquid therein. A principal and advantageous use of such additional fluid is for the purpose of temperature adjustment to supply additional heat or to quench before passing the fluid on to the next bed.

Supply conduits 48 enter the vessel 11 horizontally at a low level within beds 21 and then turn downwardly so as to pass through grids 19 into the fluid-collecting plenums 20. The lower ends of the conduits 48 are connected to distributor pipe rings 50 which are supported concentrically above the plenum outlets. Pipe rings 50 are substantially wider than the plenum outlets and are provided with ports which discharge the fluid in a generally horizontal direction and in such pattern as to at least accomplish optimum contact and admixture between the additional fluid and the disengaged fluid flowing from the grid toward the central outlet. The shape of the fluid distributor 50 is not limited to a ring design and the type of ports or nozzles may be determined in accordance with requirements for the type of fluid introduced.

The combination of apparatus elements for promoting intimate intermixing of the disengaged mixed-phase fluid and the fluid added for quenching or other purposes within the plenum beneath each bed, as well as the further intimate intermixing of all fluid as it passes into and out of well 40, forms a most important aspect of the invention and it accounts for the excellent control upon temperature, composition, and treatment of the fluid charge stream as it passes through the multiple treating zones of the reactor.

The apparatus of the invention is adapted for relatively broad use in the chemical processing field and is capable of operation over a wide range of conditions. As specifically applied to the treatment of hydrocarbons, however, it is contemplated that all necessary provisions will be made for the handling of materials at elevated temperature and pressure. For example, hydrocarbons may be processed at known cracking temperatures and pressures within the reactor may well be in the order of several thousand p.s.i.g.

It is to be understood that the invention is not limited to the specific fluid distribution means 35 illustrated in the drawings, and that necessary and simple modification thereof may be made to assure that all liquid and all gaseous material will be uniformly distributed over the surface of the bed which it is about to enter. Special precaution against liquid by-pass of the devices for conveying liquid from a tray to a bed is required in the uppermost treating chamber. If the velocity of the mixed-phase charge stream entering reactor 11 through inlet 14 is so great that, despite the action of baffle device 30, the liquid deposited upon the uppermost tray 36 is blown forcefully toward the sides of the tray and is caused to spill over the rim 37, or the liquid is splashed or deposited by condensation upon the dome of curved head 12 so that it will flow downwardly along the walls of the vessel, the tray assembly may be modified in such manner as to cause substantially all the liquid to be deposited and retained upon the tray until it can be drained therefrom through the downflow pipes.

Figure 3:
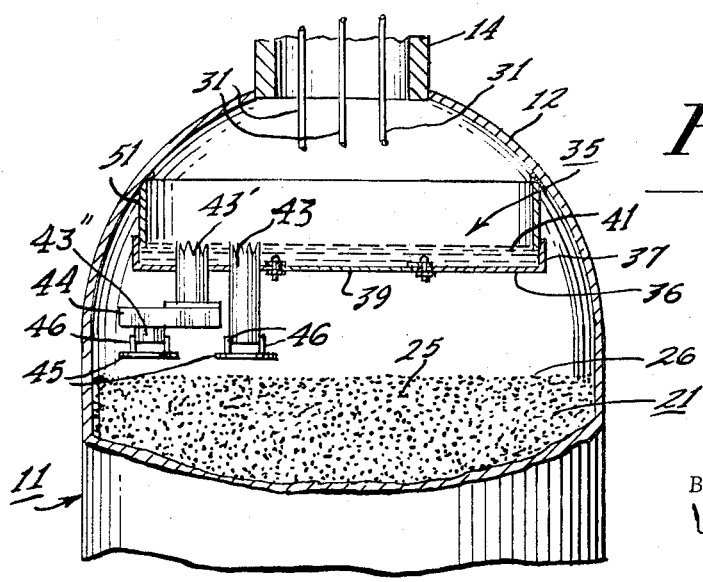
FIGURE 3 shows a modified support arrangement for the uppermost tray of the vessel. The illustration is fragmentary and diagrammatic.

Thus, if the above-mentioned adverse situation should tend to develop, a cylindrical plate-ring 51 may be substituted for or may supplement the vertical rods 38 which otherwise would hold the uppermost tray 36 in fixed suspended position, as shown in FIGURE 3. The plate-ring would be secured along its upper edge to the curved dome of head 12 and its lower end portion would extend within the rim 37 of the tray. If desired, the tray may be secured to the lower edge of the plate-ring for rigid support, or the plate-ring 51 may be in addition to rods 31 and merely depend from the roof of the chamber with its lower end portion submerged within the pool of liquid retained on the tray.

Also, the off-set pipe members 43'–43" and their horizontal cross-over may be eliminated and single off-set pipes may be used in their place. The amount of off-set could vary, dependent upon the degree of horizontal displacement required for a pipe to extend from its opening in the tray to its intended discharge location above the surface of the bed.

It is contemplated also that the trays 36 may, if desired, be supported from the sides of vessel 11, instead of being suspended from the roof of the chamber, with suitable provision for preventing liquid overflow at the rim of the tray.

Obviously many other modifications and variations of the invention as hereinbefore set forth may be made without departing from the spirit and scope thereof, and therefore only such limitations should be imposed as are indicated in the appended claims.

What is claimed is:

1. Apparatus for treating mixed-phase fluid reactants by serial flow through separate masses of contact material, comprising:
    (a) an upright reactor vessel;
    (b) an inlet for said reactants at the top and an outlet for reaction products at the bottom of said vessel;
    (c) means for separating said vessel into a plurality of superimposed reaction chambers;
    (d) a grating spaced from the bottom of each reaction chamber and arranged to support therein a porous fixed bed of contact material, the space beneath said grating forming a plenum for collection of mixed-phase fluid discharging from the bottom of said bed;
    (e) means for introducing fluid from an external source directly into said plenum and for discharging said fluid in a manner to effect maximal contact and admixture with collected mixed-phase fluid therein;
    (f) means for supporting a pool of the collected disengaged liquid in the confined space between said plenum and the surface of the below-adjacent bed;
    (g) a draw-off conduit at the bottom of said plenum, having its discharge end submerged within said pool of liquid and being arranged and adapted to convey the mixed-phase fluid withdrawn from said plenum into said pool with minimal disruption of the body of liquid by excessive turbulence;
    (h) means for withdrawing confined streams of overflow liquid from said pool and disengaged gaseous material from the space above the surface of the pool; and
    (i) means for distributing and dispersing the liquid and gaseous components of said withdrawn streams upon and over the surface of said below-adjacent bed.

2. Apparatus for treating mixed-phase fluid reactants by serial flow through separate masses of contact material, comprising:
    (a) an upright reactor vessel;
    (b) an inlet for said reactants at the top and an outlet for reaction products at the bottom of said vessel;
    (c) partitions separating said vessel into a plurality of reaction chambers, each partition having a central conduit extending downward into the chamber below;
    (d) horizontal gratings adapted to support said masses of contact material as fixed beds above said partitions, the spaces between said gratings and said partitions forming plenums for collecting the gaseous and liquid material disengaged from said beds;
    (e) means for introducing additional fluid into said plenum in such manner as to engage and intimately admix with disengaged fluid material flowing from said gratings to said central conduits;
    (f) horizontal tube-trays supported a distance below said partitions, said tube-trays having central wells to freely receive the lower end portions of said central conduits and being adapted and arranged at their outer perimeter to laterally contain a body of the collected liquid;
    (g) pluralities of downflow conduits individual to said tube-trays and having their upper end portions set in the areas surrounding said wells, the downflow conduits of each tray having their upper edges at a common low level therein to contain said body of liquid as a generally shallow pool and to provide concurrent draw-off of both liquid from the tray and gaseous material from the scape above the body of liquid, and being arranged and adapted to convey the mixed-phase streams of fluid to individual discharge locations distributed uniformly over the surface of the adjacent bed below; and
    (h) distributing baffles at said discharge locations arranged to effect optimum uniform distribution of discharging fluid over the surface of said adjacent bed.

3. Apparatus as in claim 2, in which some of said downflow conduits (g) are straight pipes extending directly from a tray opening to a discharge location vertically below, and the remaining downflow conduits comprise offset pipes extending from at ray opening to a horizontally displaced discharge location below.

4. Apparatus as in claim 3, in which each of said remaining downflow conduits comprises separate pipe sections interconnected by a horizontal open channel, whereby only the liquid components of the conveyed fluid are confined along the entire path of flow through said remaining downflow conduits.

5. Apparatus as in claim 2, in which said means (e) for introducing additional fluid into a plenum comprises an individual supply pipe entering through the side wall of said vessel and terminating at an intermediate level within the plenum and being arranged to discharge such fluid as a dispersed stream within the central region of the plenum so as to effect optimum contact and admixture with liquid and gaseous material flowing toward and into said central outlet; and individual means exteriorly of said vessel for controlling said streams of additional fluid as to amount and temperature.

6. Apparatus for treating mixed-phase fluid reactants by continuous, downward, serial flow through and between a plurality of separate porous masses of contact material comprising:
    (a) a corresponding plurality of reaction chambers arranged for gravitational flow therebetween and individually containing said masses of contact material;
    (b) conduits connecting said chambers each to provide a fluid outlet at the bottom of an upper chamber and a fluid inlet extending into the chamber next below;
    (c) a preforate member within each chamber arranged to support a fixed bed of said contact material horizontally coextensive with said chamber and at such intermediate level therein as to provide a fluid-distributing region above the surface of the bed and a fluid-collecting plenum directly beneath said perforate member;
    (d) means for introducing additional fluid from an external source into each of said plenums and for discharging the same therein in such manner as to intimately admix with disengaged mixed-phase fluid descending from said perforate member and being collected for discharge through said outlet conduit;
    (e) a shallow tray above the surface of each bed, for supporting a pool of collected liquid substantially horizontally co-extensive with said chamber, having downflow conduits arranged to receive at a common level a liquid overflow from said pool and to distribute such liquid over the surface of the bed below;

(f) a dependent receptacle at the bottom of said tray in the area directly beneath the connecting conduit from the chamber above, into which receptacle the conduit extends to a level substantially below the bottom of the tray so as to provide an annular vertical passageway between the conduit and the receptacle for reverse upward flow of the downwardly introduced fluid from the lower region of the receptacle to the main body of liquid in the pool and for lateral flow of fluid outwardly toward said downflow conduits in the tray, whereby gaseous components of mixed-phase fluid being transferred between reaction chambers are intimately admixed with accompanying liquid components in order to more readily effect liquid-vapor distribution as well as temperature and composition adjustment of the mixed-phase fluid continuously flowing downwardly through the apparatus.

References Cited
UNITED STATES PATENTS

| | | | |
|---|---|---|---|
| 3,235,344 | 2/1966 | Dreyer et al. | 208—109 |
| 3,248,316 | 4/1966 | Barger et al. | 208—111 |

ABRAHAM RIMENS, *Primary Examiner.*

UNITED STATES PATENT OFFICE
CERTIFICATE OF CORRECTION

Patent No. 3,378,349                        April 16, 1968

Robert M. Shirk

It is certified that error appears in the above identified patent and that said Letters Patent are hereby corrected as shown below:

Column 3, line 4, after "is" insert -- liquid or --; line 53, "intervals" should read -- internals --; line 71, "the" should read -- a --. Column 6, line 32, "inserts" should read -- inerts --. Column 10, line 16, "scape" should read -- space --; line 28, at ray" should read -- a tray --; line 57, "preforate" should read -- perforate --.

Signed and sealed this 9th day of September 1969.

(SEAL)
Attest:

Edward M. Fletcher, Jr.                       WILLIAM E. SCHUYLER, JR.
Attesting Officer                                Commissioner of Patents